(12) United States Patent
Yamato

(10) Patent No.: US 6,954,651 B2
(45) Date of Patent: Oct. 11, 2005

(54) RADIO COMMUNICATION SYSTEM USING TIMEOUT CONTROL WITH FLEXIBLE TIMEOUT INTERVAL SETTING

(75) Inventor: Katsumi Yamato, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 570 days.

(21) Appl. No.: 09/960,497

(22) Filed: Sep. 24, 2001

(65) Prior Publication Data

US 2002/0055365 A1 May 9, 2002

(30) Foreign Application Priority Data

Sep. 29, 2000 (JP) ........................................ 2000-301444

(51) Int. Cl.$^7$ ................................................. H04B 7/00
(52) U.S. Cl. ........................ 455/509; 455/511; 370/229
(58) Field of Search ........................... 455/158.1–158.3, 455/166.2, 509–512, 517, 452.1, 452.2; 370/229, 236, 345, 349, 384, 395.1, 443–444, 508

(56) References Cited

U.S. PATENT DOCUMENTS

| | | | |
|---|---|---|---|
| 6,411,622 B1 * | 6/2002 | Ohgane | 370/395.1 |
| 2003/0156569 A1 * | 8/2003 | Kawakami et al. | 370/345 |

FOREIGN PATENT DOCUMENTS

| | | |
|---|---|---|
| EP | 0 830 040 | 3/1998 |
| WO | WO 97/16039 | 5/1997 |
| WO | WO 00/01173 | 1/2000 |

OTHER PUBLICATIONS

L. Zhang, Computer Communication Review, vol. 16, No. 3, pp. 397–405, XP–000743153, "Why TCP Timers Don't Work Well", Aug. 5–7, 1986.

"Broadband Radio Access Networks (BRAN); HIPERLAN Type 2; Packet based Convergence Layer; Part 1:Common Part" ETSI TS 101 493–1, V1.1.1, Apr. 2000, pp. 1–27.

* cited by examiner

Primary Examiner—George Eng
(74) Attorney, Agent, or Firm—Oblon, Spivak, McClelland, Maier & Neustadt, P.C.

(57) ABSTRACT

In a radio communication system in which packet communications are carried out by setting up one or more connections between the radio base station and radio terminals, a radio base station or a radio terminal carries out the timeout control in which any packet that cannot be received completely through one connection within a timeout interval that is set in advance with respect to the one connection is regarded as lost, a change in a number of active connections that are currently carrying out communications with the radio base station is detected, and a new timeout interval is calculated and set with respect to each connection when the change in the number of active connections is detected.

19 Claims, 10 Drawing Sheets

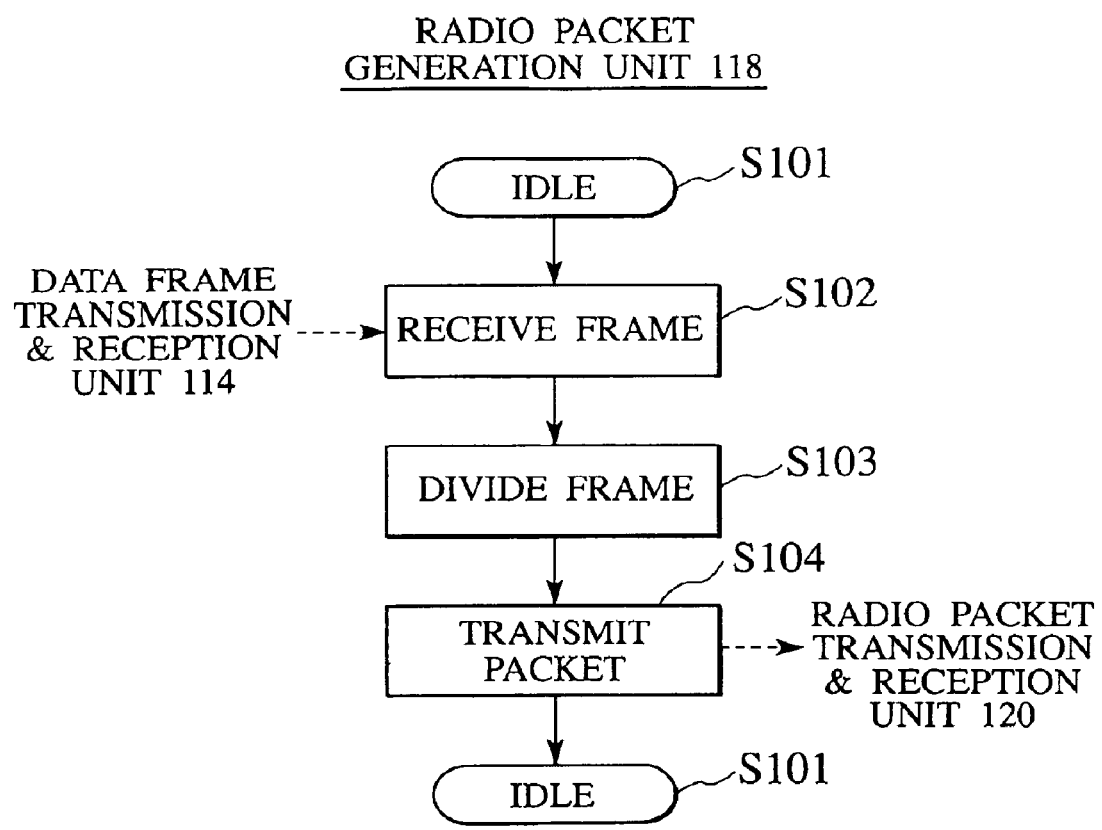

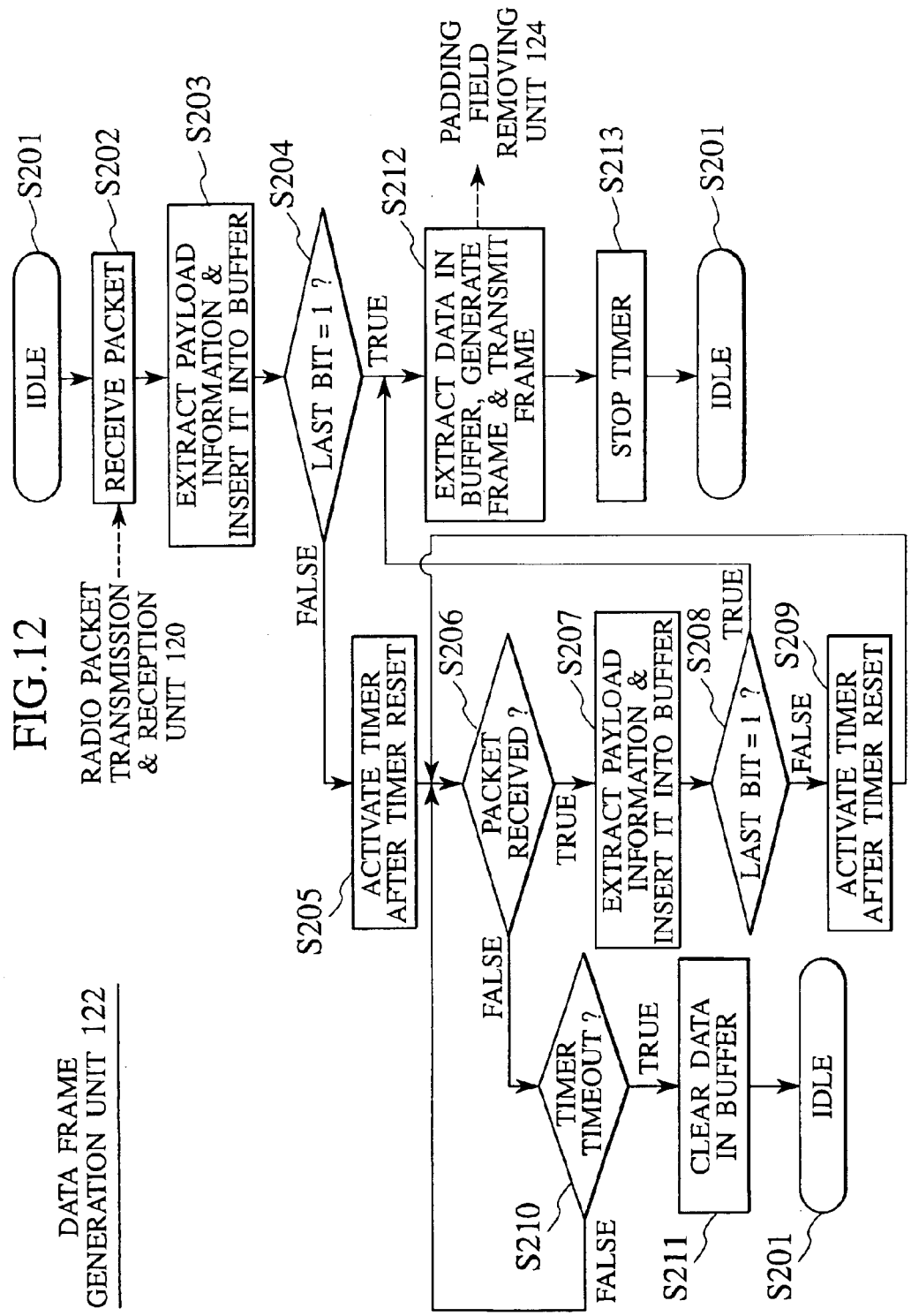

RADIO COMMUNICATION SYSTEM USING TIMEOUT CONTROL WITH FLEXIBLE TIMEOUT INTERVAL SETTING

BACKGROUND OF THE INVENTION

1. Field of the Invention

The present invention relates to a radio communication system using a timeout control, and more particularly, to a radio communication system capable of realizing a more effective timeout control by setting a timeout interval dynamically.

2. Description of the Related Art

FIG. 8 shows an exemplary configuration of a general radio communication system. As shown in FIG. 8, this radio communication system comprises radio base stations 100 and 102, radio terminals 104 and 106 connected with the radio base stations 100 and 102 via radio, respectively, and a data communication network 108 to which the radio terminals 104 and 106 are connected through the radio base stations 100 and 102. Then, a radio channel 110 is formed between the radio base station 100 and the radio terminal 104, and a radio channel 112 is formed between the radio base station 102 and the radio terminal 106.

In FIG. 8, the radio base station 100 and the radio terminal 104 are carrying out data transmission and reception through the radio channel 110 while the radio base station 102 and the radio terminal 106 are carrying out data transmission and reception through the radio channel 112, but these pairings can be changed as the radio terminals 104 and 106 move. Also, from viewpoints of the radio terminals 104 and 106, the radio base station to be a source of received data and the radio base station to a destination of the transmitted data can be different.

Through the radio channels 110 and 112, data communications using radio packets as defined by the protocols specific to the respective radio channels are carried out. In this case, in order to realize the data communications of the radio terminals 104 and 106 with terminals or servers (not shown) connected to the data communication network 108, there is a need for each one of the radio base stations 100 and 102 and the radio terminals 104 and 106 to have a frame-packet conversion unit. This frame-packet conversion unit converts data frames such as Ethernet frames or IP packets into radio packets for respective radio channels, and converts radio packets of respective radio channels into data frames.

FIG. 9 shows an exemplary configuration of the frame-packet conversion unit described above, which is directed to a case where it is assumed that the payload length of the radio packet is a fixed length of 48 bytes according to HIPERLAN/2 (High Performance Radio Local Area Network Type2) and the Ethernet frame as a data frame to be transmitted is allowed to have a length up to about 1500 bytes. In FIG. 9, this frame-packet conversion unit comprises a data frame transmission and reception unit 114, a padding field attaching unit 116, a radio packet generation unit 118, a radio packet transmission and reception unit 120, a data frame generation unit 122, and a padding field removing unit 124.

Here, the operation of the frame-packet conversion unit shown in FIG. 9 will be described with reference to FIG. 10, which explains the case of converting a data frame into radio packets (at a time of transmission), as well as the case of converting radio packets into a data frame 8 at a time of reception).

First, at a time of the transmission, the data frame transmission and reception unit 114 receives a data frame transmitted to the radio channel from the upper layer (Ethernet layer/IP layer). The radio packet generation unit 118 generates a plurality of radio packets by dividing the received data frame. Here, before that generation begins, the padding field attaching unit 116 determines a padding field region length and attaches a padding field to the data frame, for the purpose of making the payload length of the last radio packet equal to that of the other radio packets. The padding field region length is described as an information in a trailer, and the data frame transmission and reception unit 114 recognizes the padding field region in the data frame according to that description.

As described above, the data frame attached with the padding field region and the trailer will be divided into a plurality of radio packets by the radio packet generation unit 118.

FIG. 11 shows a processing procedure for the radio packet generation operation by the radio packet generation unit 118. In FIG. 11, while the radio packet generation unit 118 is in an idle state (step S101), when the data frame is received from the padding field attaching unit 116 (step S102), that data frame is divided to generate a plurality of radio packets (step S103), In this packet generation, the value of the last bit region provided in a header of the radio packet is determined as follows.

(a) A value "1" is set to a last radio packet constituting the data frame.

(b) A value "0" is set to the other packets.

Then, the radio packet generation unit 118 gives all the generated radio packets to the radio packet transmission and reception unit 120 (step S104). After that, the radio packet generation unit 118 returns to the idle state (step S101), and waits for the arrival of a new data frame.

Returning now to FIG. 10, the radio packets generated as described above will be given to the lower layer (radio datalink control layer) by the radio packet transmission and reception unit 120, and transmitted onto the radio channel.

On the other hand, at a time of the reception, the radio packet transmission and reception unit 120 receives the radio packets from the lower layer. The data frame generation unit 122 generates a data frame from the received radio packets.

FIG. 12 shows a processing procedure of the data frame generation operation by the data frame generation unit 122. In FIG. 12, while the data frame generation unit 122 is in an idle state (step S201), when a radio packet is received from the radio packet transmission and reception unit 120 (step S202), the payload information is extracted from the radio packet and inserted into a buffer (step S203). At a time of this extraction, if the last bit value of the received radio packet is "0" (step S204 FALSE), the arrival of the subsequent packet will be awaited, and whenever a radio packet is received from the radio packet transmission and reception unit 120 (step S206 TRUE), the payload information is extracted and attached to the information already stored in the buffer (step S207).

On the other hand, if the last bit value of the radio packet received from the radio packet transmission and reception unit 102 is "1" (step S024 TRUE and step S208 TRUE), the information stored in the buffer is extracted as a frame and given to the padding field removing unit 124 (step S212). After that, the data frame generation unit 122 returns to the idle state (step S201), and waits for the arrival of a new radio packet. Then, the padding field removing unit 124 removes the padding field region and the trailer from the received frame and gives the resulting frame to the data frame transmission and reception unit 114.

Now, in general, the radio communications is associated with the problem that they are prone to be affected by noises or interference radio waves and the received signal quality can be degraded considerably for this reason. As a result, a probability for the loss of radio packet becomes considerably higher compared with the case of communications using wired channels. The original data frame cannot be recovered when even one radio packet is lost, so that the entire data frame have to be discarded when such a radio packet loss occurs.

In order to detect such a loss of radio packet at early stage, there is a proposition to provide the so called timer at the data frame generation unit 122 of FIG. 9. Namely, as shown in FIG. 12, in addition to the processing procedure described above, the data frame generation unit 122 actually activates the timer after the timer reset if the last bit value of the received radio packet is "0" (step S204 FALSE). Then, whenever the radio packet with the last bit value of "0" is received (step S208 FALSE), the timer is re-activated (step S209). Note that, when the activated timer becomes timeout while waiting for the arrival of the subsequent radio packet (step S210 TRUE), it is judged that this radio packet is lost and all of the radio packets already received are discarded (step S211).

By executing such a timeout control, it becomes possible to detect the radio communication error at early stage. In particular, the timeout control is effective in detecting the loss of the last radio packet that constitutes the data frame.

As described, in the case of carrying out the data communications using radio channels in which the signal quality can be degraded considerably, it is possible to detect the radio packet loss at early stage by executing the timeout control by setting the timeout interval according to the data transmission rate of the data communications at the receiving side of the radio data communications.

However, the performance of the radio data communication system is significantly affected by the value to be set as the timeout interval. Namely, if the timeout interval is set to be extremely short, for example, there is a possibility for the timeout to occur before the completion of the reception even for the radio packet that is normally transmitted without being affected by the signal quality degradation. In this case, the timeout control would judge that this packet is lost and the original data frame would be discarded as a result. On the other hand, if the timeout interval is set to be extremely long, the time required for the receiving side to judge that the radio packet is lost on the radio channel would become very long so that the effect of the timeout control would be diminished.

Usually, in the case where there are a plurality of connections for carrying out communications with the same radio base station, the communications will be carried out by sharing the bandwidth that can be provided by that radio base station among these connections. In other words, the data transmission rate that can be provided at each connection will be different depending on the number of connections that are currently in communications. Thus, when the data transmission rate at each connection varies, it is desirable to use a system in which the timeout interval can be set flexibly according to the variation of the data transmission rate.

BRIEF SUMMARY OF THE INVENTION

It is therefore an object of the present invention to provide a radio data communication system using a more effective timeout control that can prevent excessive data frame discarding or excessive timeout interval setting by setting the timeout interval flexibly according to the state of the radio data communications.

According to one aspect of the present invention there is provided a radio terminal device for use in a radio communication system in which packet communications are carried out by setting up one or more connections between the radio terminal device and a radio base station, the radio terminal device comprising: a packet receiving unit configured to receive packets from the radio base station through the connections; and a timeout control unit configured to carry out a timeout control in which any packet that cannot be received completely through one connection within a timeout interval that is set in advance with respect to the one connection is regarded as lost, a change in a number of active connections that are currently carrying out communications with the radio base station is detected, and a new timeout interval is calculated and set with respect to each connection when the change in the number of active connections is detected.

According to another aspect of the present invention there is provided a radio base station device for use in a radio communication system in which packet communications are carried out by setting up one or more connections between the radio base station device and radio terminals, the radio base station device comprising: a packet receiving unit configured to receive packets from the radio terminals through the connections; and a timeout control unit configured to carry out a timeout control in which any packet that cannot be received completely through one connection within a timeout interval that is set in advance with respect to the one connection is regarded as lost, a change in a number of active connections that are currently carrying out communications with the radio base station device is detected, and a new timeout interval is calculated and set with respect to each connection when the change in the number of active connections is detected.

According to another aspect of the present invention there is provided a method of timeout control at either one of a radio terminal and a radio base station in a radio communication system in which packet communications are carried out by setting up one or more connections between the radio base station and radio terminals, the method comprising: regarding any packet that cannot be received completely through one connection within a timeout interval that is set in advance with respect to the one connection as lost; detecting a change in a number of active connections that are currently carrying out communications with the radio base station; and calculating and setting a new timeout interval with respect to each connection when the change in the number of active connections is detected.

According to another aspect of the present invention there is provided a computer program product for causing a computer to execute a method of timeout control at either one of a radio terminal and a radio base station in a radio communication system in which packet communications are carried out by setting up one or more connections between the radio base station and radio terminals, the computer program product comprising: first computer program codes for causing the computer to regard any packet that cannot be received completely through one connection within a timeout interval that is set in advance with respect to the one connection as lost; second computer program codes for causing the computer to detect a change in a number of active connections that are currently carrying out communications with the radio base station; and third computer program codes for causing the computer to calculate and set a new timeout interval with respect to each connection when the change in the number of active connections is detected.

Other features and advantages of the present invention will become apparent from the following description taken in conjunction with the accompanying drawings.

BRIEF DESCRIPTION OF THE DRAWINGS

FIG. 11 is a flow chart showing a processing procedure for a radio packet generation operation to be carried out by a radio packet generation unit in the frame-packet conversion unit of FIG. 9.

FIG. 12 is a flow chart showing a processing procedure for a data frame generation operation to be carried out by a data frame generation unit in the frame-packet conversion unit of FIG. 9.

DETAILED DESCRIPTION OF THE INVENTION

Figure 1:
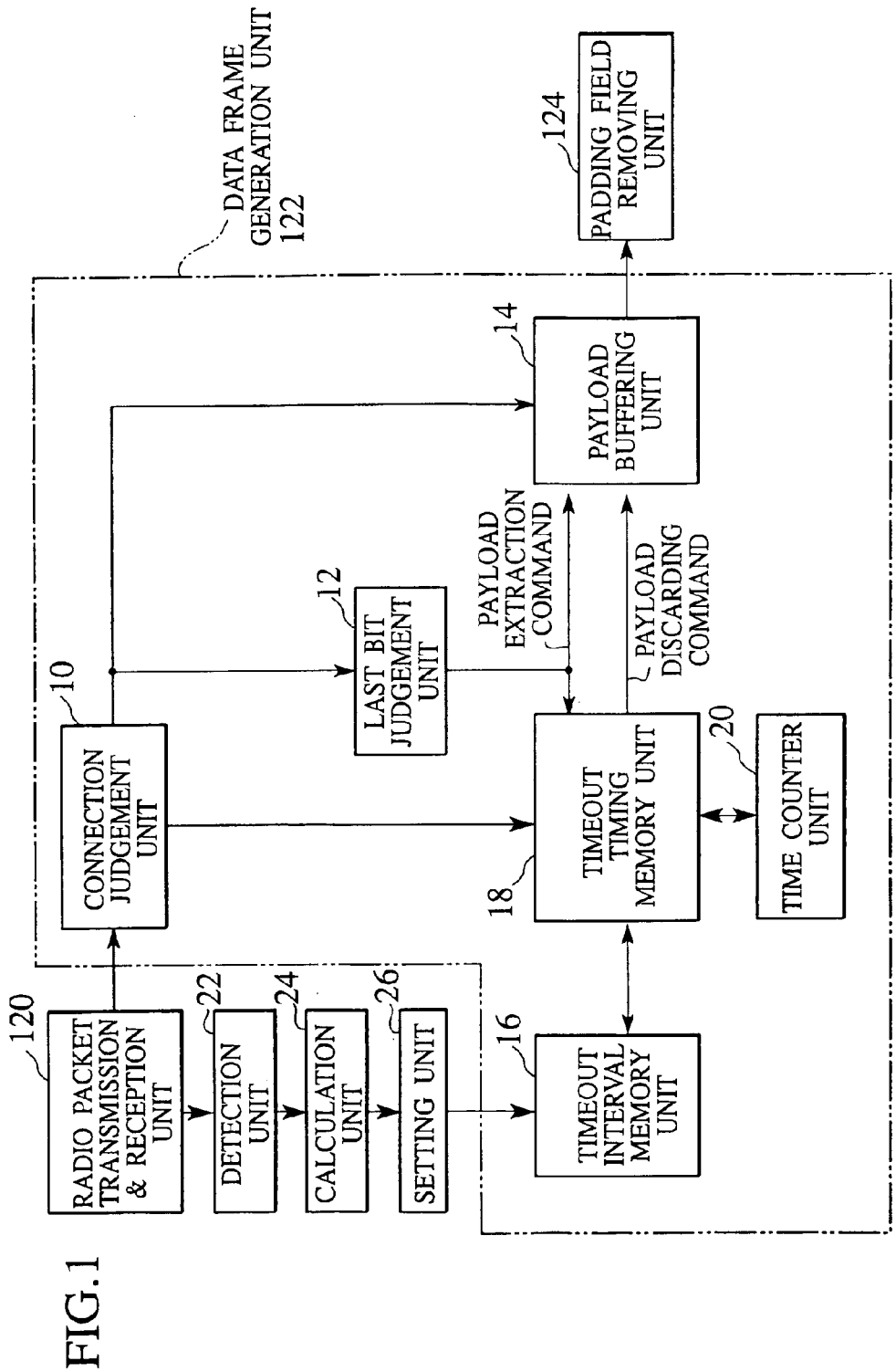
FIG. 1 is a block diagram showing a configuration of a data frame generation unit in a frame-packet conversion unit to be provided at a radio base station and a radio terminal constituting a radio communication system according to one embodiment of the present invention.

Referring now to FIG. 1 to FIG. 7, one embodiment of the radio communication system according to the present invention will be described in detail. In the following, elements corresponding to those elements appearing in FIG. described above will be given the same reference numerals in the drawings.

Figure 9:
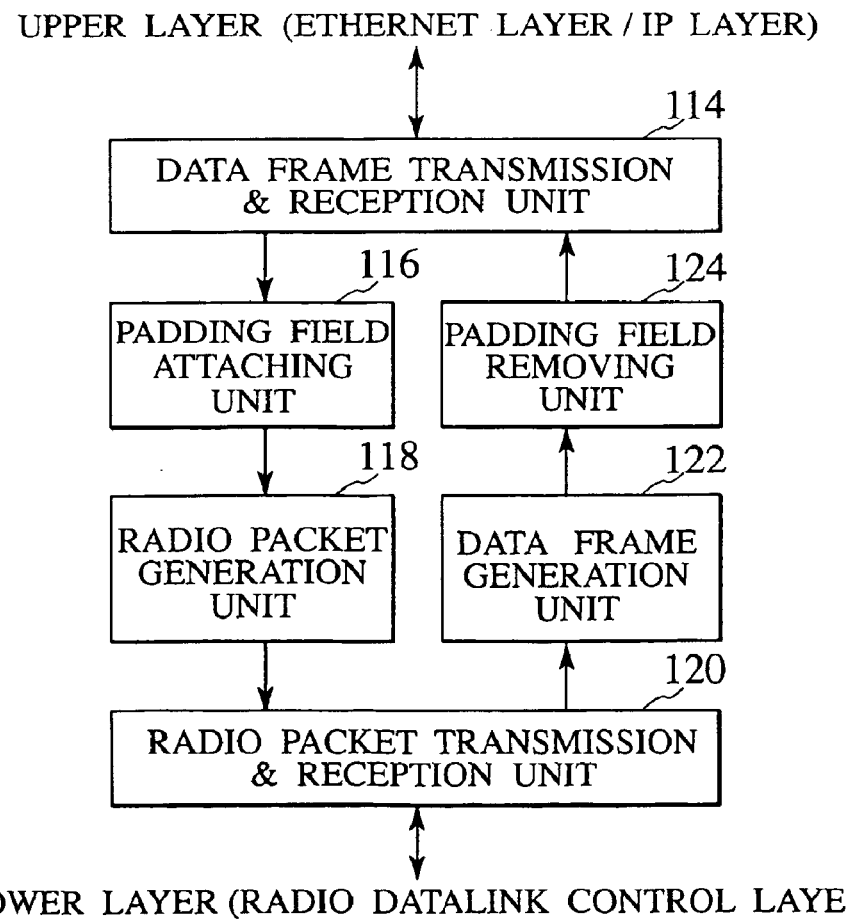
FIG. 9 is a block diagram showing an exemplary configuration of a frame-packet conversion unit provided in radio base stations and radio terminals in the radio communication system of FIG. 8.
Figure 10:
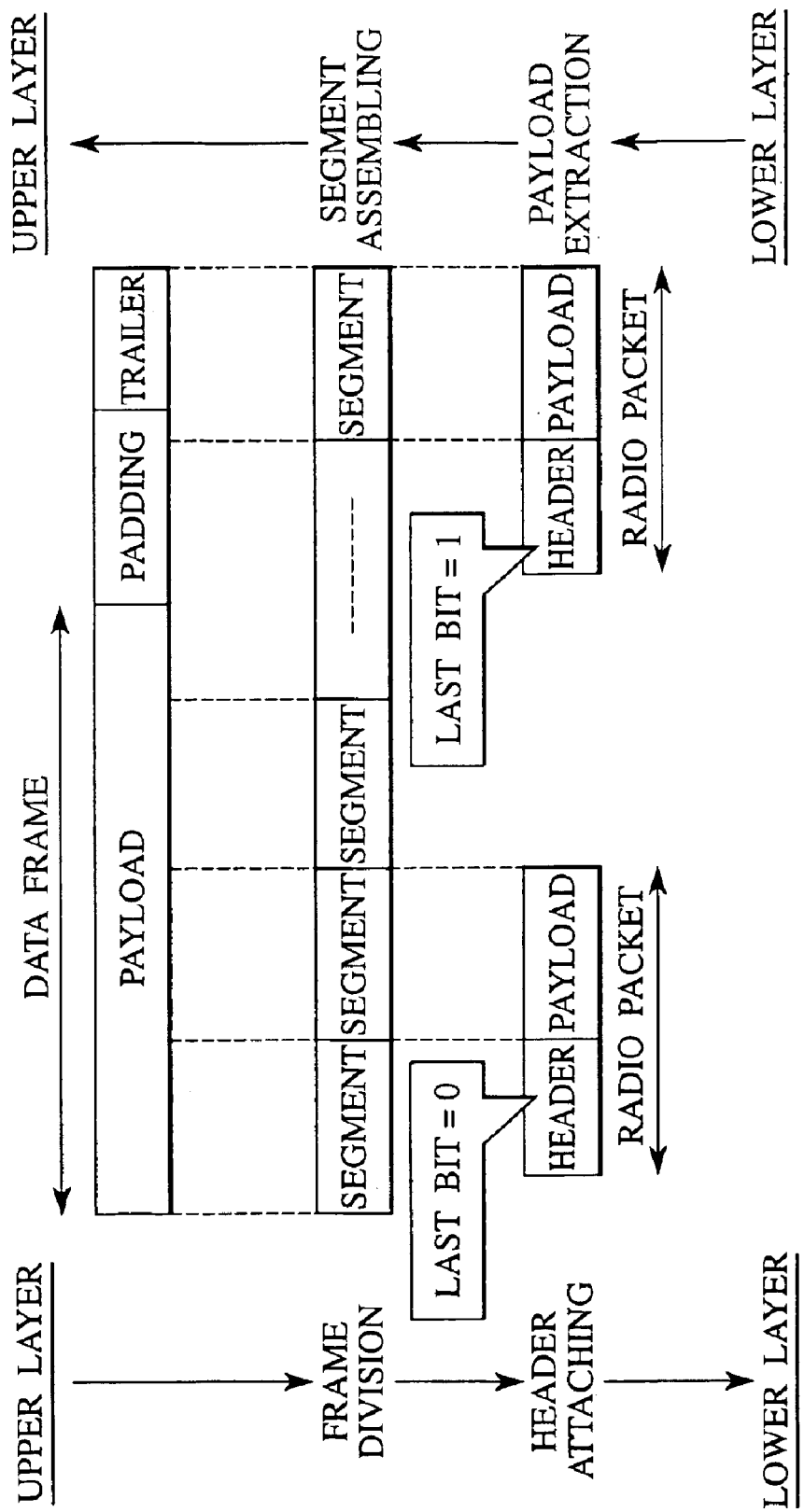
FIG. 10 is a diagram showing a processing procedure for converting a data frame into radio packets or converting radio packets into a data frame in the frame-packet conversion unit of FIG. 9.

FIG. 1 shows a configuration surrounding a data frame generation unit 122 in a frame-packet conversion unit to be provided at a radio base station and a radio terminal that constitute a radio communication system according to this embodiment. This embodiment is directed to the case of modifying the configuration surrounding the data frame generation unit in the frame-packet conversion unit shown in FIG. 9. Note that FIG. 1 only shows a configuration that is necessary for executing the timeout control with respect to the received radio packet, for the sake of simplicity.

In FIG. 1, the data frame generation unit 122 of this embodiment at least comprises a connection judgement unit 10, a last bit judgement unit 12, a payload buffering unit 14, a timeout interval memory unit 16, a timeout timing memory unit 18, and a time counter unit 20. In addition, the configuration of FIG. 1 includes a detection unit 22 for detecting a change in a number of active connections that are currently carrying out communications with the radio base station, a calculation unit 24 for calculating a new timeout interval with respect to each connection when the change in the number of active connections is detected, and a setting unit 26 for setting the new timeout interval into the timeout interval memory unit 16.

According to the configuration of FIG. 1, it becomes possible to set the timeout interval for each connection in the case of providing the radio data communications belonging to a plurality of connections simultaneously.

Figure 2:
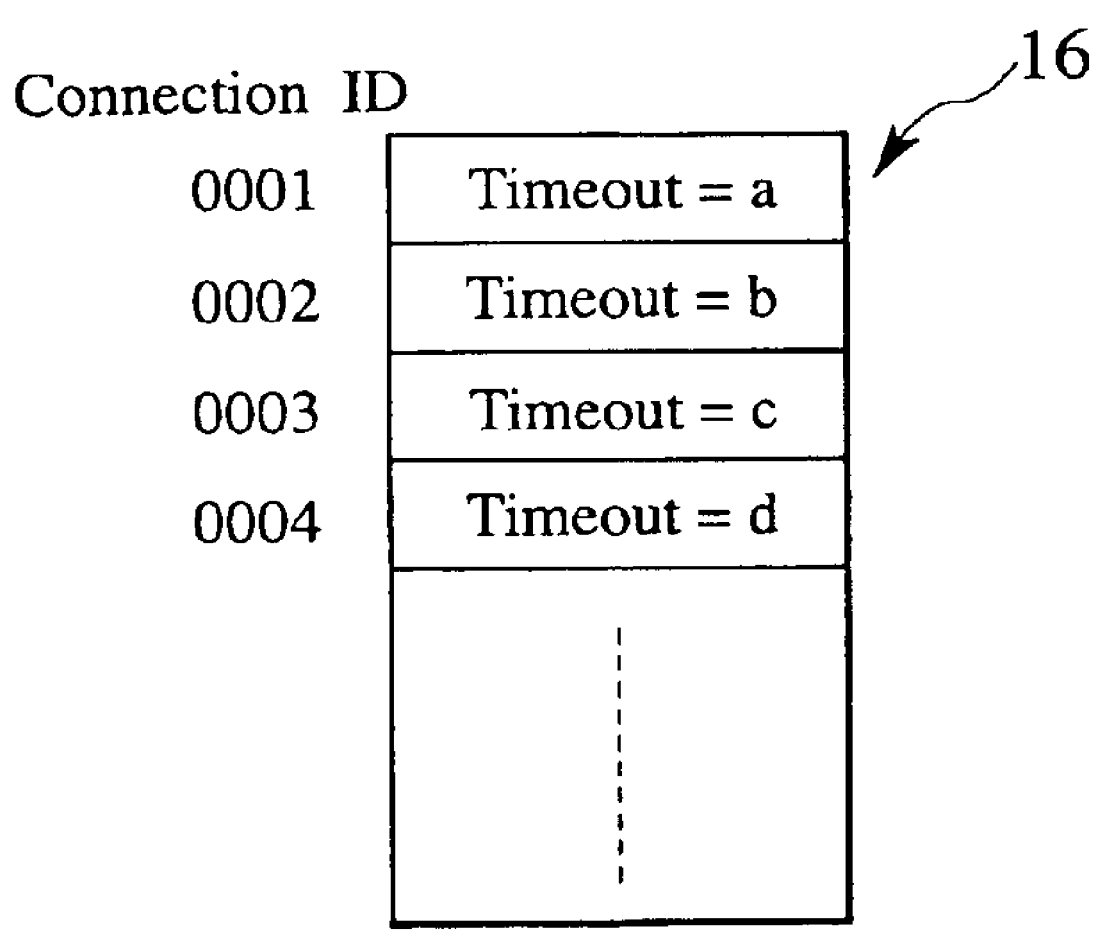
FIG. 2 is a diagram showing a data configuration in a timeout interval memory unit in the data frame generation unit of FIG. 1.

FIG. 2 shows a data configuration in the timeout interval memory unit 16 of the data frame generation unit 122 shown in FIG. 1. The timeout interval memory unit 16 stores a connection identifier ("Connection ID") that is set up between the radio base station and the radio terminal and the timeout interval ("Timeout") that is set up in correspondence to each connection.

Figure 3:
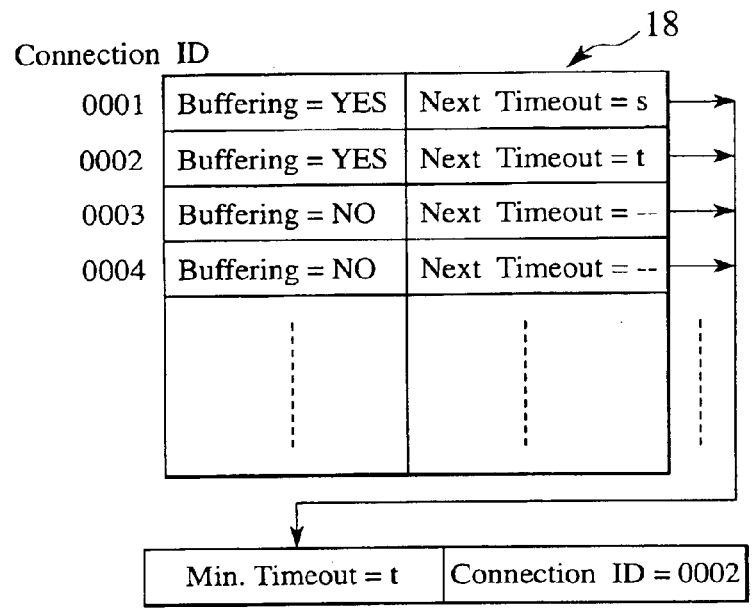
FIG. 3 is a diagram showing a data configuration in a timeout timing memory unit in the data frame generation unit of FIG. 1.

FIG. 3 shows a data configuration in the timeout timing memory unit 18 of the data frame generation unit 122 shown in FIG. 1. The timeout timing memory unit 18 stores a buffering information ("Buffering") indicating whether the payload information of the radio packet belonging to each connection is stored in the payload buffering unit 14 or not, and a timing ("Next Timeout") at which the next timeout occurs for the radio packet belonging to each connection, with respect to each connection identifier ("Connection ID") described above.

Next, the operation of the data frame generation unit 122 of FIG. 1. In FIG. 1, when the connection judgement unit 10 receives the radio packet from the radio packet transmission and reception unit 120, the connection identifier of the connection to which that packet belongs is extracted, Then, the extracted connection identifier is given to the timeout timing memory unit 18. In addition, the received radio packet itself is given to the last bit judgement unit 12 and the payload buffering unit 14.

The payload buffering unit 14 stores the payload information of the radio packet for each connection identifier. Note that the payload information of the radio packets belonging to the same connection will be stored by being concatenated in an order of their arrival to the payload buffering unit 14.

The last bit judgement unit 12 checks the last bit value of the radio packet received from the connection judgement unit 10, and judges whether that radio packet is the last packet that constitutes some data frame or not. The result of this judgement is then given to the timeout timing memory unit 18 and the payload buffering unit 14.

When the received radio packet is not the last packet, the timeout timing memory unit 18 refers to the connection identifier of that radio packet received from the connection judgement unit 10 and reads out the timeout interval corresponding to that connection identifier from the timeout interval memory unit 16. Then, the current time indicated by the time counter unit 20 is added to the read out timeout interval, and the resulting value is stored into the timeout timing memory unit 18 as a new timeout timing corresponding to that connection identifier. At this point, if the buffering information corresponding to that connection identifier is "NO", this buffering information is changed to "YES" so as to validate the corresponding timeout timing.

On the other hand, when the arrived packet is the last packet, the payload buffering unit 14 gives the payload information corresponding to the connection identifier of the arrived radio packet to the padding field removing unit 124. The timeout timing memory unit 18 changes the buffering information corresponding to the connection identifier received from the connection judgement unit 10 to "NO" so as to invalidate the corresponding timeout timing.

When the time indicated by the time counter unit 20 reaches to the timeout timing stored in the timeout timing memory unit 18, the timeout timing memory unit 18 applies the timeout processing with respect to the payload information belonging to the connection corresponding to that timeout timing. In this case, as shown in FIG. 3, the timeout timing that will be reached earliest among the connections for which the buffering information is "YES" is separately maintained as the minimum timeout timing ("Min. Timeout") along with the corresponding connection identifier. Then, the timeout timing memory unit 18 regularly compares this minimum timeout timing with the time indicated by the time counter unit 20. Note that the timeout timing memory unit 18 updates the minimum timeout timing whenever the buffering information or the timeout timing value stored in the timeout timing memory unit 18 is changed.

When the timeout is detected, the timeout timing memory unit 18 gives the connection identifier of the connection for which the timeout has occurred, to the payload buffering unit 14, and changes the buffering information corresponding to that connection identifier to "NO" so as to invalidate the corresponding timeout timing. Also, the payload buffering unit 14 that received the connection identifier from the timeout timing memory unit 18 will delete all the corresponding payload information.

In this way, using the data frame generation unit of this embodiment, it becomes possible to set the timeout interval for each connection separately, so that it becomes possible to realize a more flexible timeout control. For example, it is possible to realize the timeout control in which the timeout interval is set short with respect to the connection that requires the real time communications as in the case of speech communications, so as not to have more than necessary delays with respect to the radio packet transmission such that the radio packets with the excessive delays will be discarded immediately. It is also possible to realize the timeout control in which the timeout interval is set long with respect to the connection that does not require the real time property but requires the communications with high reliability as in the case of file transfer such that the discarding of the radio packets due to the timeout will be avoided as much as possible.

Now, because there is an upper limit to the communication resource (bandwidth) available to one radio base station, the data transmission rate that can be provided with respect to each connection will vary according to the number of connections that carry out communications with that radio base station. Consequently, unless the timeout interval to be set with respect to each connection is changed according to this variation, the performance of the radio data communication system will be degraded.

For example, if the timeout interval with respect to some connection is set shorter than necessary, there arises a possibility for the timeout to occur before the reception of the normally transferred radio packet is completed. In this case, the timeout control would judge that this radio packet is lost and the original data frame would be discarded as a result. On the contrary, if the timeout interval with respect to some connection is set longer than necessary, the time required for judging that the radio packet is discarded in conjunction with the radio channel quality degradation would become longer so that the effect of the timeout control would be diminished.

For these reasons, with respect to those connections for which the data transmission rate that can be provided will vary depending on the number of connections that are currently in communications at one base stations (which will be referred to as active connections hereafter), it is expected that the control to change the timeout interval in conjunction with the change of the number of active connections is effective. Usually, the management regarding connections is realized at the radio base station side. Consequently, it becomes possible to realize the control to change the timeout interval appropriately by providing the radio base station with functions for managing the number of active connections and controlling the number of timeout interval according to the change in the number of active connections.

Here, as the method for counting the number of active connections, it is possible to use a method in which the number of connections that are actually set up between the radio base station and the radio terminals is set as the number of active connections. It is also possible to use a method in which those connections for which the radio packet transmission has not been carried out over a prescribed period of time are regarded as non-active connections even if they are set up and the number of these connections is subtracted from the number of active connections.

In the following, four exemplary methods for the timeout interval control in the radio communication system formed by the radio base station and the radio terminals as described above will be described.

EXAMPLE 1

Figure 4:
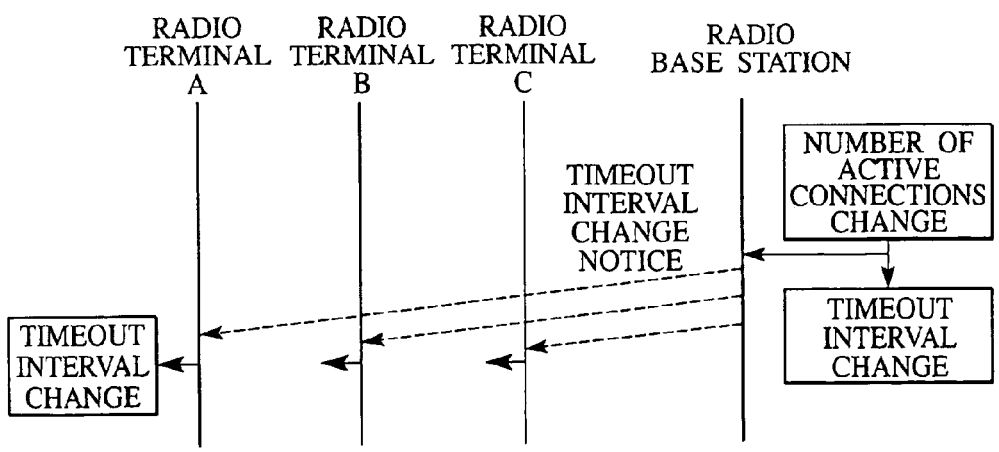
FIG. 4 is a sequence chart for a first timeout interval control method according to one embodiment of the present invention.

FIG. 4 shows an exemplary sequence chart for the first timeout interval control method according to this embodiment. FIG. 4 shows a procedure by which the radio base station recognizes the change in the number of active connections and requests the change of the timeout interval to the radio base station itself and the radio terminals.

In FIG. 4, when the number of active connections managed by the radio base station changes, the data transmission rate that can be provided with respect to each connection will change, so that the radio base station notifies the change of the timeout interval to the radio base station itself and all the radio terminals that are carrying out communications with the radio base station. In general, when the number of active connections decreases, the data transmission rate that can be provided with respect to each connection will increase. Consequently, the radio base station requests to make the timeout interval shorter. On the other hand, when the number of active connections increases, the data transmission rate that can be provided with respect to each connection will decrease, so that the radio base station requests to make the timeout interval longer.

Here, a content of the timeout interval change notification to be notified from the radio base station to the radio terminals can be such that (1) the timeout interval is calculated at the radio base station and its threshold is notified to the radio terminals, or (2) whether the timeout interval should be made longer or shorter due to the change in the number of active connections alone is notified from the radio base station and the timeout interval is calculated at each radio terminal separately, for example.

Also, a method for realizing the timeout interval change notification can be (1) a method in which the radio packet for describing the notification content is defined and this radio packet is broadcast to all the radio terminals that are carrying out communications with the radio base station, or (2) a method in which an area for describing the notification content is provided as an information on the radio channel defined at the physical layer, and this information is broadcast to all the radio terminals that are carrying out communications with the radio base station, for example.

Also, the timeout interval can be calculated by the following formula.

$$\text{Timeout interval (sec)} = \frac{\text{Radio packet length(byte)}}{\text{Data transmission rate (byte/sec) of the connection}} + \alpha(\text{sec})$$

where $\alpha$ is a margin (positive number) to be set by accounting for the delay jitter or the like associated with the radio packet transmission.

EXAMPLE 2

Figure 5:
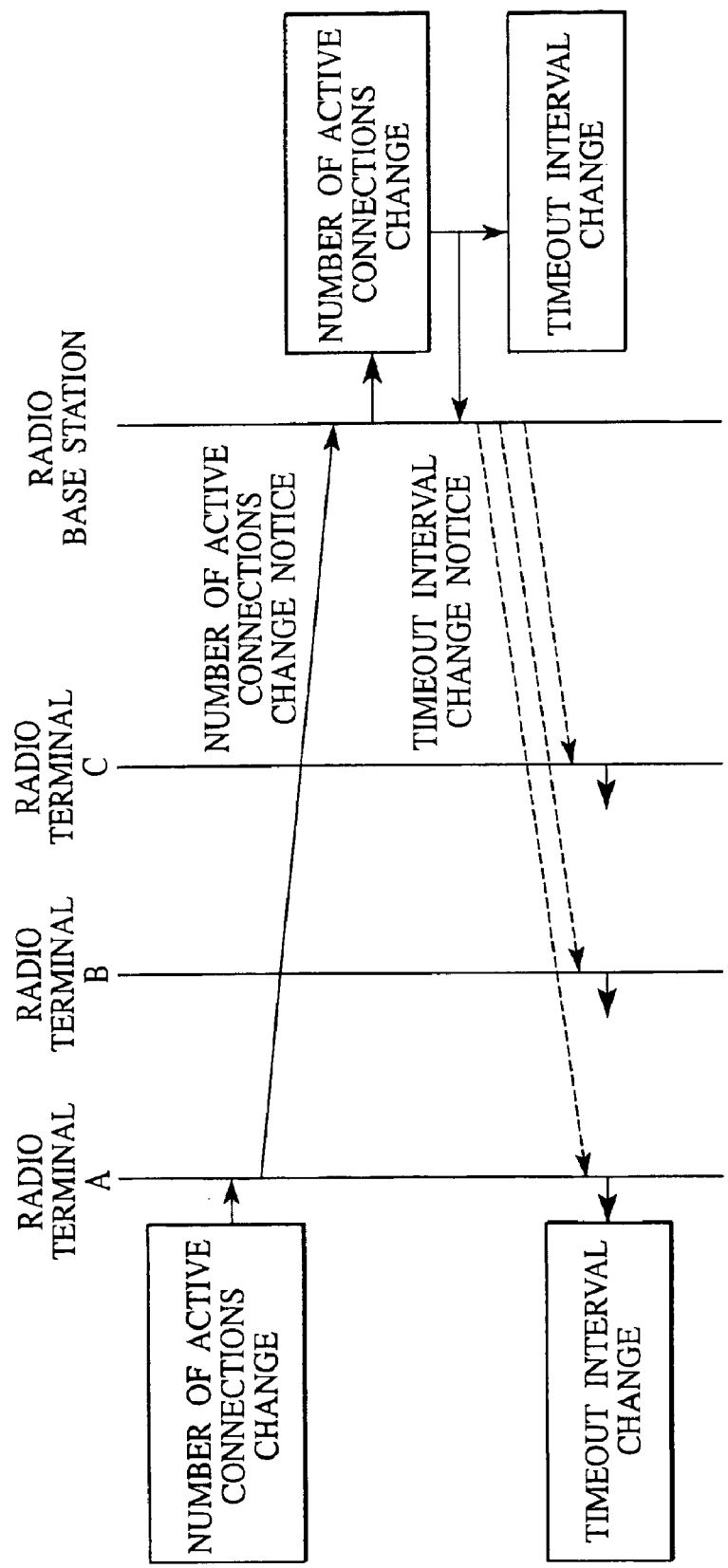
FIG. 5 is a sequence chart for a second timeout interval control method according to one embodiment of the present invention.

FIG. 5 shows an exemplary sequence chart for the second timeout interval control method according to this embodiment. FIG. 5 shows a procedure by which one radio terminal recognizes the change in the number of active connections and requests the change of the timeout interval to the radio base station and the radio terminals.

In FIG. 5, the radio terminal that recognized the change in the number of active connections needs to notify that fact to the radio base station. Here, a method for realizing this notification can be (1) a method in which a radio packet for describing the notification content is defined and this radio packet is transmitted to the radio base station, or (2) a method in which an area for describing the notification content is provided as an information on the radio channel defined at the physical layer and this information is transmitted to the radio base station, for example. The processing after the radio base station recognizes the change in the number of active connections is the same as in the case of FIG. 4.

EXAMPLE 3

In the examples 1 and 2 described above, the timeout interval is not necessarily changed for all the connections due to the increase or decrease of the number of active connections. For example, in the case of the connection for which some data transmission rate is guaranteed before the communication starts, there will be no change in the data transmission rate due to the increase or decrease of the other active connections so that the timeout interval should be a fixed value.

When the data transmission rate is corrected during communications of the connection for which some data transmission rate is guaranteed before the communication starts, the radio bandwidth available to the other connections that are using the same radio base station as that connection will be changed so that the data transmission rates for these other connections will also be changed in conjunction. Thus, the timeout interval should be changed even in such a case.

Figure 6:
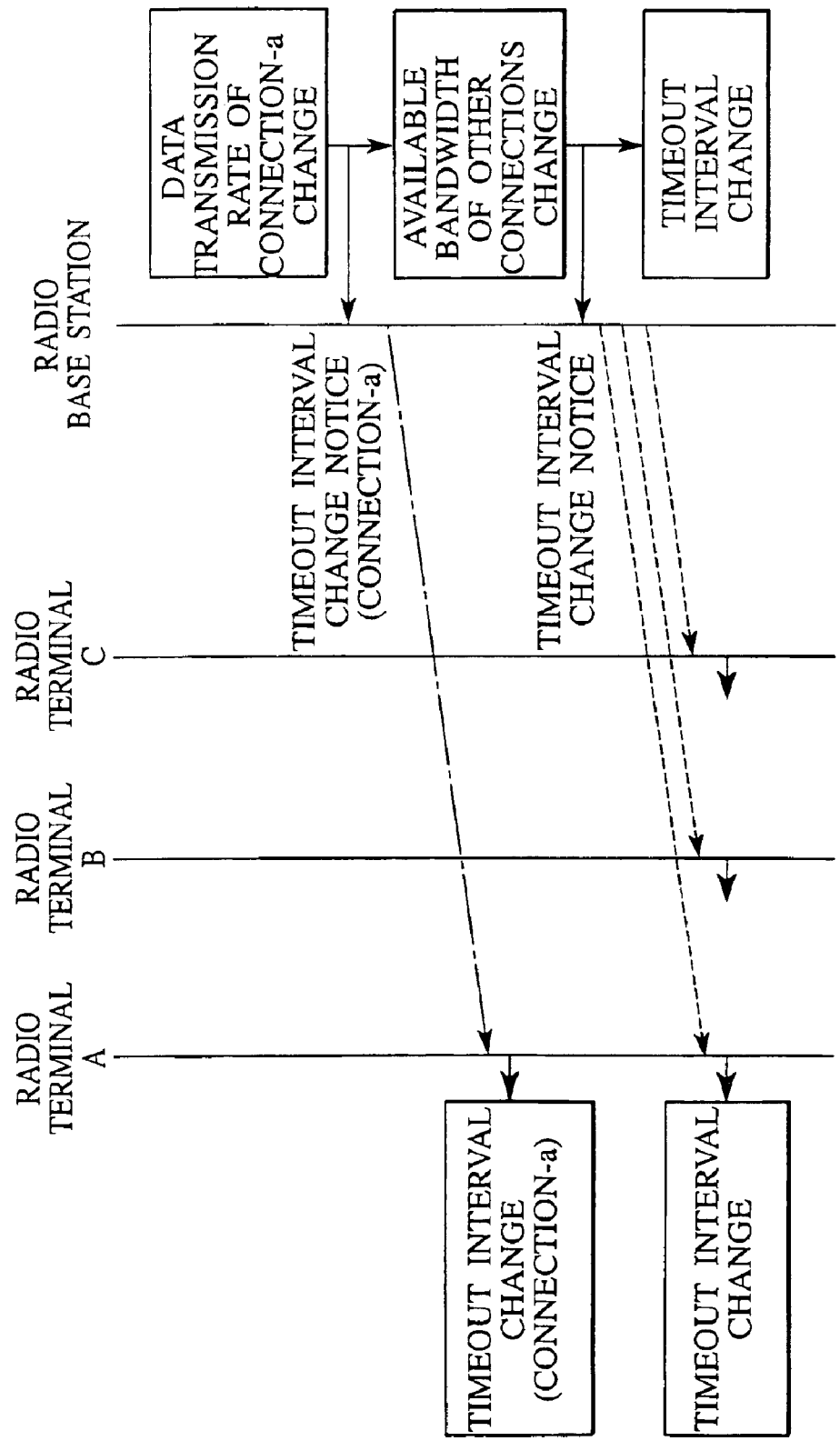
FIG. 6 is a sequence chart for a third timeout interval control method according to one embodiment of the present invention.

FIG. 6 shows an exemplary sequence chart for the third timeout interval control method according to this embodiment. FIG. 6 shows a procedure by which the change of the guaranteed data transmission rate for a connection having the radio base station as a source is recognized and the change of the timeout interval is requested. More specifically, FIG. 6 is directed to the case where the change occurs in the data transmission rate for the connection-a which has the radio base station as a source and the radio terminal A as a destination.

In FIG. 6, when the radio base station recognizes the change in the data transmission rate for the connection-a, the radio base station notifies the change of the timeout interval to the radio terminal A which is a destination of the connection-a. In addition, due to the change in the data transmission rate for the connection-a, the data transmission rates that can be provided with respect to the other active connections will also be changed. For this reason, the radio base station notifies the change of the timeout interval to the radio base station itself and all the radio terminals that are carrying out communications with the radio base station. Here, the method for notifying the change of the timeout interval for the active connections other than the connection-a is the same as in the case of FIG. 4.

EXAMPLE 4

Figure 7:
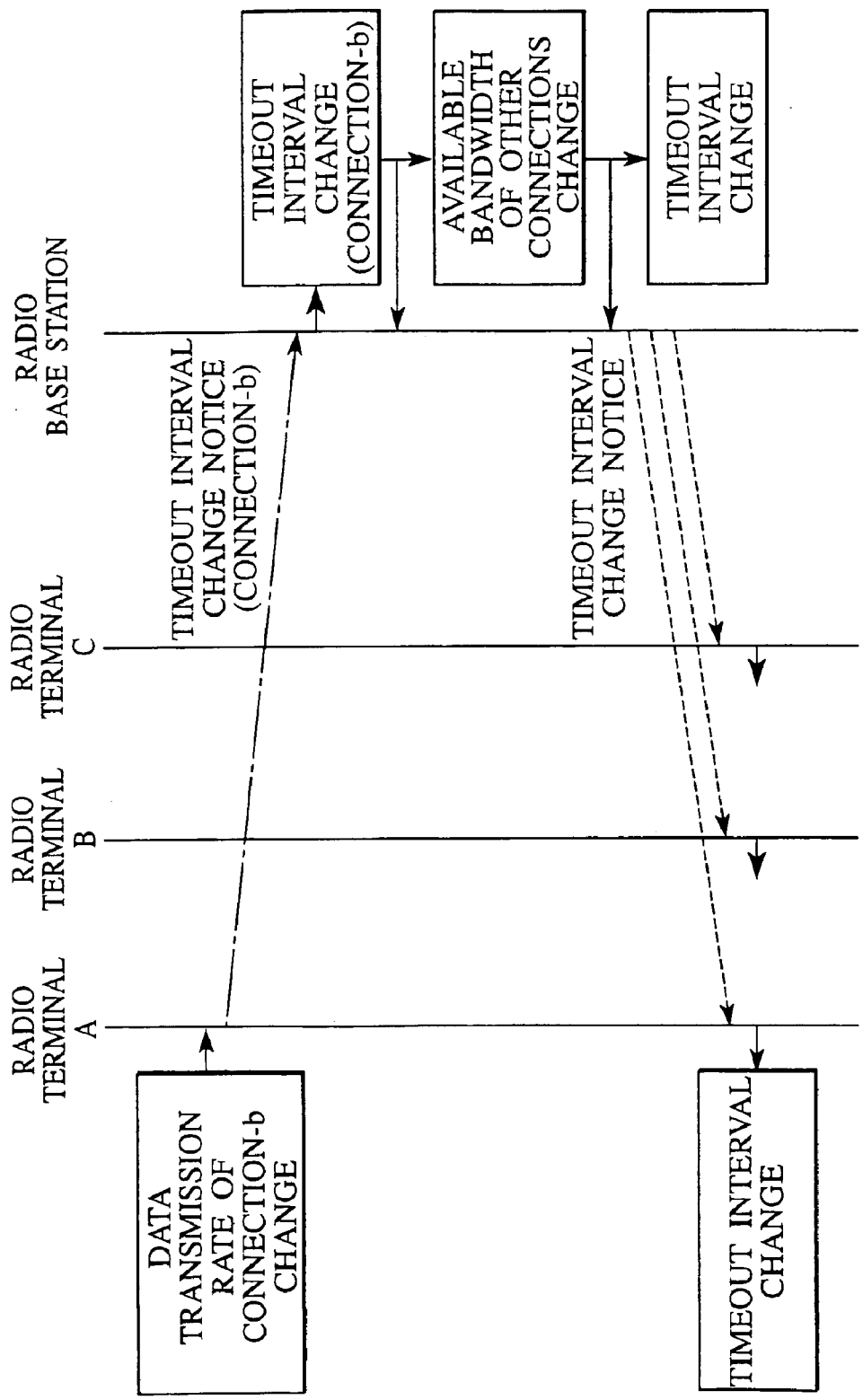
FIG. 7 is a sequence chart for a fourth timeout interval control method according to one embodiment of the present invention.
Figure 8:
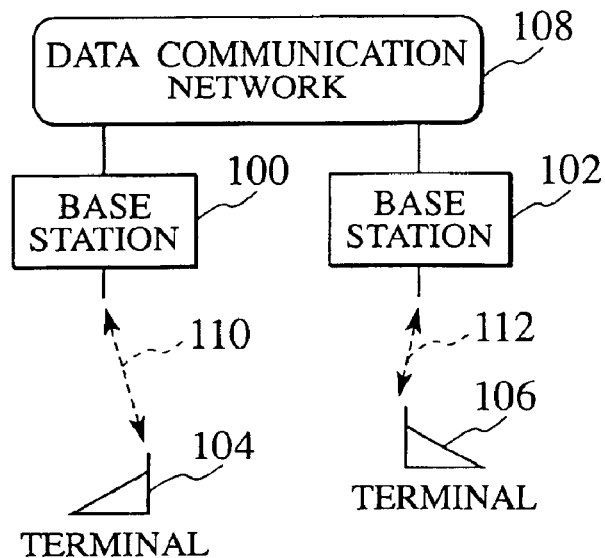
FIG. 8 is a schematic diagram showing an exemplary configuration of a general radio communication system.

FIG. 7 shows an exemplary sequence chart for the fourth timeout interval control method according to this embodiment. FIG. 7 shows a procedure by which the change of the guaranteed data transmission rate for a connection having the radio terminal as a source is recognized and the change of the timeout interval is requested. More specifically, FIG. 7 is directed to the case where the change occurs in the data transmission rate for the connection-b which has the radio terminal A as a source and the radio base station as a destination.

In FIG. 7, when the radio terminal A recognizes the change in the data transmission rate for the connection-b, the radio terminal A notifies the change of the timeout interval to the radio base station which is a destination of the connection-b. Here, the subsequent processing to be applied to the active connections is the same as in the case of FIG. 6.

As described, according to the present invention, it is possible to realize a radio communication system with a more effective timeout control by setting the timeout interval dynamically.

According to the present invention, the timeout value of each connection can be set flexibly for each connection separately according to the state of the radio communications such as the change in the transfer rate guaranteed for each connection. For this reason, it is possible to prevent the excessive packet discarding and the excessive timeout value setting, so that it is possible to realize a more effective timeout control.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the radio base station and the radio terminal of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio terminal device for use in a radio communication system in which packet communications are carried out by setting up one or more connections between the radio terminal device and a radio base station, the radio terminal device comprising:
    a packet receiving unit configured to receive packets from the radio base station through the connections;
    a time counter configured to read current time; and
    a timeout control unit configured to store a timeout interval for each connection and a timeout timing for each connection, to update the timeout timing with a new timeout timing with respect to each connection when a received packet is not a last packet, the new timeout timing being calculated by adding the timeout interval to the current time read by the time counter, and to carry out a timeout control in which a packet that is not received completely through one connection by the time the current time reaches the timeout timing with respect to the one connection is regarded as lost,
    wherein when said timeout control unit detects a change in a number of active connections that are currently carrying out communications with the radio base station said timeout control unit calculates a new timeout interval, and sets the new timeout interval to each connection.

2. The radio terminal device of claim 1, wherein the timeout control unit counts the number of active connections as a number of connections that are actually set up between the radio base station and radio terminals.

3. The radio terminal device of claim 1, wherein the timeout control unit counts the number of active connections as a number of connections that are set up between the radio base station and radio terminals and for which packet transmission has been carried out until the current time reaches the timeout timing.

4. The radio terminal device of claim 1, wherein the timeout control unit calculates and sets the new timeout interval which is shorter than a previous timeout interval when the number of active connection is decreased, or calculates and sets the new timeout interval which is longer than the previous timeout interval when the number of active connection is increased.

5. The radio terminal device of claim 1, wherein the timeout control unit leaves the timeout interval unchanged for a connection for which a data transmission rate is guaranteed at a time of setting up that connection.

6. The radio terminal device of claim 1, wherein the timeout control unit also calculates and sets the new timeout interval with respect to each connection when a data transmission rate provided with respect to one of the connections is changed.

7. A radio base station device for use in a radio communication system in which packet communications are carried out by setting up one or more connections between the radio base station device and radio terminals, the radio base station device comprising:
    a packet receiving unit configured to receive packets from the radio terminals through the connections;
    a time counter configured to read current time; and
    a timeout control unit configured to store a timeout interval for each connection and a timeout timing for each connection, to update the timeout timing with a new timeout timing with respect to each connection when a received packet is not a last packet, the new timeout timing being calculated by adding the timeout interval to the current time read by the time counter, and to carry out a timeout control in which a packet that is not received completely through one connection by the time the current time reaches the timeout timing with respect to the one connection is regarded as lost,
    wherein when said timeout control unit detects a change in a number of active connections that are currently carrying out communications with the radio base station device said timeout control unit calculates a new timeout interval, and sets the new timeout interval to each connection.

8. The radio base station device of claim 7, wherein the timeout control unit counts the number of active connections as a number of connections that are actually set up between the radio base station device and the radio terminals.

9. The radio base station device of claim 7, wherein the timeout control unit counts the number of active connections as a number of connections that are set up between the radio base station device and the radio terminals and for which packet transmission has been carried out until the current time reaches the timeout timing.

10. The radio base station device of claim 7, wherein the timeout control unit calculates and sets the new timeout interval which is shorter than a previous timeout interval when the number of active connection is decreased, or calculates and sets the new timeout interval which is longer than the previous timeout interval when the number of active connection is increased.

11. The radio base station device of claim 7, wherein the timeout control unit leaves the timeout interval unchanged for a connection for which a data transmission rate is guaranteed at a time of setting up that connection.

12. The radio base station device of claim 7, wherein the timeout control unit also calculates and sets the new timeout interval with respect to each connection when a data transmission rate provided with respect to one of the connections is changed.

13. A method of timeout control at either one of a radio terminal and a radio base station in a radio communication system in which packet communications are carried out by setting up one or more connections between the radio base station and radio terminals, the method comprising:
    reading current time;
    updating a timeout timing with a new timeout timing with respect to each connection when a received packet is not a last packet, the new timeout timing being calculated by adding a timeout interval to the current time being read;

executing a timeout control in which a packet that is not received completely through one connection by the time the current time reaches the timeout timing with respect to the one connection is regarded as lost;

detecting a change in a number of active connections that are currently carrying out communications with the radio base station; and calculating and setting a new timeout interval with respect to each connection when the change in the number of active connections is detected.

14. The method of claim 13, wherein the detecting step counts the number of active connections as a number of connections that are actually set up between the radio base station and the radio terminals.

15. The method of claim 13, wherein the detecting step counts the number of active connections as a number of connections that are set up between the radio base station and the radio terminals and for which packet transmission has been carried out until the current time reaches the timeout timing.

16. The method of claim 13, wherein the calculating and setting step calculates and sets the new timeout interval which is shorter than a previous timeout interval when the number of active connection is decreased, or calculates and sets the new timeout interval which is longer than the previous timeout interval when the number of active connection is increased.

17. The method of claim 13, wherein the calculating and setting step leaves the timeout interval unchanged for a connection for which a data transmission rate is guaranteed at a time of setting up that connection.

18. The method of claim 13, wherein the calculating and setting step also calculates and sets the new timeout interval with respect to each connection when a data transmission rate provided with respect to one of the connections is changed.

19. A computer program product for causing a computer to execute a method of timeout control at either one of a radio terminal and a radio base station in a radio communication system in which packet communications are carried out by setting up one or more connections between the radio base station and radio terminals, the computer program product comprising:

first computer program codes configured to cause the computer to update a timeout timing with a new timeout timing with respect to each connection when a received packet is not a last packet, the new timeout timing being calculated by adding a timeout interval to current time read by the computer;

second computer program codes configured to cause the computer to regard a packet that is not received completely through one connection by the time the current time reaches the timeout timing with respect to the one connection as lost;

third computer program codes configured to cause the computer to detect a change in a number of active connections that are currently carrying out communications with the radio base station; and fourth computer program codes configured to cause the computer to calculate a new timeout interval and to set the new timeout interval to each connection when the change in the number of active connections is detected.

* * * * *